(12) United States Patent
Payne et al.

(10) Patent No.: US 8,755,393 B2
(45) Date of Patent: Jun. 17, 2014

(54) FACILITATING COMMUNICATION OF ROUTING INFORMATION

(75) Inventors: Richard A. Payne, Wokingham (GB); Andrei Agapi, Amsterdam (NL); Robert M. Broberg, Berwyn, PA (US); Ralph H. Castain, Fort Collins, CO (US); John A. DeNisco, Malden, MA (US)

(73) Assignee: Cisco Technology, Inc., San Jose, CA (US)

( * ) Notice: Subject to any disclaimer, the term of this patent is extended or adjusted under 35 U.S.C. 154(b) by 616 days.

(21) Appl. No.: 12/753,437

(22) Filed: Apr. 2, 2010

(65) Prior Publication Data

US 2011/0243150 A1 Oct. 6, 2011

(51) Int. Cl.
*H04L 12/28* (2006.01)

(52) U.S. Cl.
USPC ............ 370/401; 709/203; 709/220; 709/224

(58) Field of Classification Search
None
See application file for complete search history.

(56) References Cited

U.S. PATENT DOCUMENTS

| | | | | |
|---|---|---|---|---|
| 7,401,120 B2* | 7/2008 | Walbeck et al. | ............... | 709/203 |
| 7,457,830 B1 | 11/2008 | Coulter et al. | | |
| 7,522,537 B2* | 4/2009 | Joshi | ............................... | 370/254 |
| 7,606,929 B2* | 10/2009 | Gbadegesin et al. | ......... | 709/235 |
| 7,620,041 B2* | 11/2009 | Dunn et al. | .................... | 370/389 |
| 7,630,341 B2* | 12/2009 | Buddhikot et al. | ............ | 370/331 |
| 7,684,352 B2 | 3/2010 | Smith et al. | | |
| 7,962,458 B2 | 6/2011 | Holenstein et al. | | |
| 2005/0007961 A1* | 1/2005 | Scott et al. | ...................... | 370/252 |
| 2005/0278726 A1 | 12/2005 | Cano et al. | | |
| 2007/0050519 A1 | 3/2007 | Cano et al. | | |
| 2008/0043742 A1* | 2/2008 | Pong et al. | ..................... | 370/394 |
| 2008/0107043 A1* | 5/2008 | Smith et al. | .................... | 370/255 |
| 2008/0279183 A1 | 11/2008 | Wiley et al. | | |
| 2010/0085887 A1 | 4/2010 | Ray et al. | | |
| 2010/0191884 A1 | 7/2010 | Holenstein et al. | | |

OTHER PUBLICATIONS

Agapi, et al., U.S. Appl. No. 12/753,520, filed Apr. 2, 2010, "*Facilitating Persistence of Routing States*".
U.S. Patent and Trademark Office Official Action in U.S. Appl. No. 12/753,520, dated Apr. 5, 2012, 13 pages.
U.S. Patent and Trademark Notice of Allowance and Fee(s) Due in U.S. Appl. No. 12/753,520, 8 pages, Sep. 19, 2012.

* cited by examiner

*Primary Examiner* — Michael J Moore, Jr.
(74) *Attorney, Agent, or Firm* — Baker Botts L.L.P.

(57) ABSTRACT

In certain embodiments, facilitating communication of routing information includes receiving, at a shim, incoming messages communicating routing information from a first protocol point of one or more protocol points operating according to a routing protocol. The shim belongs to an internal region separate from an external region, and a transport layer is disposed between the shim and the protocol points. The incoming messages are processed and sent to siblings that belong to the internal region. Each sibling implements a state machine for the routing protocol. Outgoing messages are received from a first sibling. The outgoing messages are processed and sent to a second protocol point of the one or more protocol points.

20 Claims, 3 Drawing Sheets

FACILITATING COMMUNICATION OF ROUTING INFORMATION

TECHNICAL FIELD

The present disclosure relates generally to telecommunications.

BACKGROUND

In communication networks, routers may communicate routing information to each other. The routing information allows the routers to select routes on which to communicate traffic. In certain situations, a router may experience a failure. Accordingly, procedures may be implemented to protect the routing information.

DESCRIPTION OF EXAMPLE EMBODIMENTS

Overview

In certain embodiments, facilitating communication of routing information includes receiving, at a shim, incoming messages communicating routing information from a first protocol point of one or more protocol points operating according to a routing protocol. The shim belongs to an internal region separate from an external region, and a transport layer is disposed between the shim and the protocol points. The incoming messages are processed and sent to siblings that belong to the internal region. Each sibling implements a state machine for the routing protocol. Outgoing messages are received from a first sibling. The outgoing messages are processed and sent to a second protocol point of the one or more protocol points.

DESCRIPTION

Figure 1:
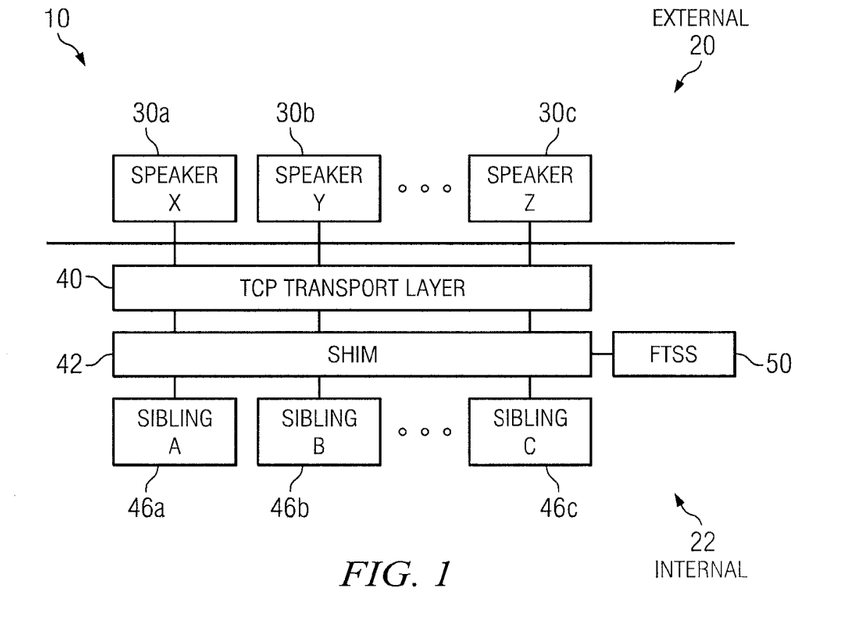
FIG. 1 illustrates an example of a system in which communication of routing information may be facilitated.

FIG. 1 illustrates an example of a system 10 in which communication of routing information may be facilitated. In the illustrated example, system 10 operates in an external region 20 separate from an internal region 22. System 10 includes one or more protocol points, such as speakers 30 (30a-c), that belong to external region 20. System 10 includes a transport layer (such as Transmission Control Protocol (TCP) transport layer 40), a shim 42, two, three, or more siblings 46 (46a-c), and a fault tolerant storage service (FTSS) 50 that belong to internal region 22. Transport layer 40 is disposed between shim 42 and the protocol points.

In certain embodiments, shim 42 receives incoming messages communicating routing information from a first protocol point (such as a speaker 30) that operates according to a routing protocol. Shim 42 processes and sends the incoming messages to siblings 46 that operate as state machines for the routing protocol. In certain embodiments, shim 42 receives outgoing messages from siblings 46 and processes and sends the outgoing messages from a selected sibling 46 to a second protocol point (such as a speaker 30), which may be the same as or different from the first protocol point. In certain embodiments, shim 42 may determine that a sibling 46 is not operating and transfer operation to another sibling 46.

In certain embodiments, FTSS 50 may facilitate persistence of routing states by calculating a key value for a data element. The key value may be calculated from at least a part of content of the first data element. FTSS 50 may automatically select K computing elements from X computing element nodes according to the key value and a mapping schema. In particular embodiments, K may be a number greater than 2 and less than X. The K computing element nodes may each include computer-readable memory embodied within one or more routers. FTSS 50 may automatically write K replications of the data element to the computer-readable memory of the K computing element nodes. The term "router" as used herein generally refers to a network device that forwards packets to an intended destination. Various embodiments may use routers substantially similar to those manufactured by Cisco Systems. In certain embodiments, system 10 may use or include a router that is a distributed system and that includes multiple computing elements.

In certain embodiments, external region 20 may represent one or more communication networks. A communication network allows components to communicate with other components and may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Routing information of the messages may include any suitable information that describes routes of external region 20. A route may be any suitable link or path through devices that may be used to communicate packets. Routing information may describe routes that are available and routes that are not available. For example, routing information may include a route advertisement that includes characteristics of a route, an announcement that announces an available route, and/or a route withdrawal that indicates that a route is no longer available. Routing information may also include attributes that describe features used in the route selection process. Examples of attributes may include Border Gateway Protocol (BGP) attributes such as weight, local preference, multi-exit discriminator, origin, autonomous system path attribute, next hop attribute, community attribute, and/or any other suitable attribute.

In certain embodiments, internal region 22 may represent one or more computing devices, for example, one or more routers. Components of internal region 22 may belong to (such as operate in, perform operations for, and/or reside in) the one or more computing devices in any suitable manner. As an example, shim layer 42 and siblings 46 may belong to one device or may belong to two or more devices. As another example, shim 42 may belong to one device, while siblings 46 may belong to another device. As another example, shim 42 may belong to two or more devices, while siblings 46 may belong to one device. As another example, siblings 46 may belong to two or more devices, while shim 42 may belong to one device. As another example, shim 42 may belong to one device and may manage sets of two or more siblings 46, where each set operates for a particular device (such as a router).

In certain embodiments, a protocol point may be any suitable computing device that operates according to a routing protocol to provide routing information. Any suitable routing protocol may be used. Examples of routing protocols include distance vector and link state protocols, such as an Intermediate System to Intermediate System (IS-IS) routing protocol, a Border Gateway Protocol (BGP) routing protocol, or other suitable routing protocol. In embodiments where IS-IS routing protocol is used, TCP transport layer 40 may be omitted.

In certain embodiments, a protocol point may be router, such as an IS-IS router or a BGP speaker (which may be represented by a speaker 30). In certain embodiments, a protocol point may be a routing table that sends and receives routing information to and from internal region 22. A routing table may be any suitable data structure that stores routing information, for example, available routes.

Transport layer 40 operates to encapsulate application data to yield packets that can be transported across a communication network of external region 20. In certain embodiments, transport layer 40 is disposed between shim 42 and external region 20 such that transport layer 40 facilitates communication between shim 42 and external region 20. A transport layer 40 may be a Layer 4 transport layer.

In certain embodiments, a sibling 46 implements a state machine for the routing protocol. A sibling 46 may implement a protocol-specific state machine to perform some, most, or all operations of the state machine. For example, a BGP sibling may calculate best paths according to BGP updates. A sibling 46 may have any suitable implementation. For example, a BGP sibling may have a QUAGGA or CISCO NX-OS implementation. Siblings 46 may run on separate device (such as router) components and may operate independently of each other.

Shim 42 facilitates communication of routing information between speakers 30 and siblings 46. Shim 42 may virtualize the operation of siblings 46 such that multiple siblings 46 appear as a single sibling 46 to speakers 30. For example, shim 42 may make connections with speakers 30 and may operate as a single point of entry/exit for the protocol data (such as routing information) for a router. In certain embodiments, shim 42 may understand the update format of the routing protocol, but need not implement advanced features of the routing protocol as siblings 46 may implement the advanced features.

In certain embodiments, shim 42 receives incoming messages communicating routing information from a protocol point and processes and sends the incoming messages to siblings 46. Shim 42 may process the incoming messages in any suitable manner. Example of methods for processing incoming message is described in more detail with reference to FIGS. 2 and 4. In certain embodiments, shim 42 uses a message queue to process messages. An example of a message queue is described in more detail with reference to FIG. 3.

Figure 5:
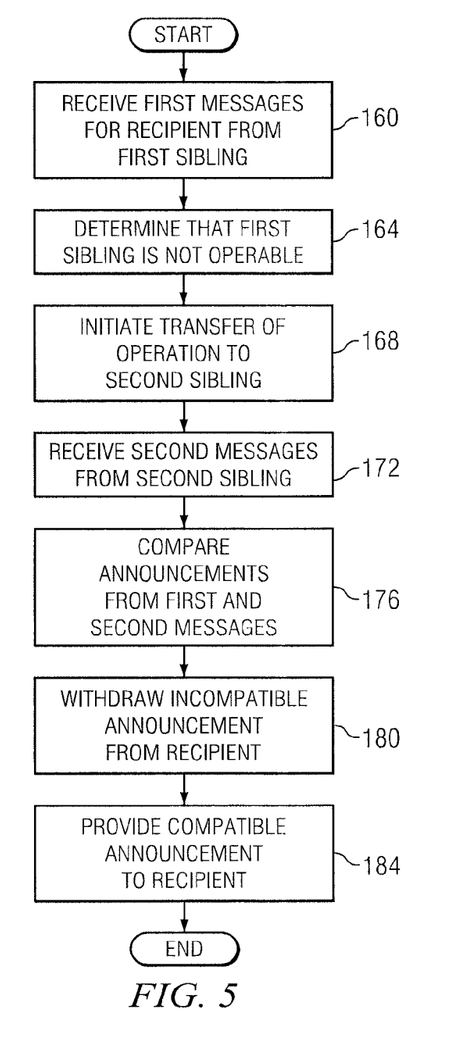
FIG. 5 illustrates an example of a method that may be used to process outgoing messages.

In certain embodiments, shim 42 receives outgoing messages from a siblings 46 and processes and sends the outgoing messages from a selected sibling 46 to a protocol point. Shim may process the outgoing message in any suitable manner. An example of a method for processing outgoing messages is described in more detail with reference to FIG. 5.

In certain embodiments, shim 42 may have an internal state that summarizes routing information received by shim 42. For example, a first set of message may add a first set of routes, a second set of message may delete a second set of routes. The internal state may include the routes that result from the additions and deletions of routes. In certain embodiments, internal state may include full information (complete messages) received from speakers 30 and summarized information (state and attributes of the messages) received from siblings 46. In the embodiments, full information from speakers 30 may be used to initiate a new sibling. Summarized information may be used to change from one sibling 46a to another sibling 46b by withdrawing previously announced routes that are no longer valid.

In certain embodiments, shim 42 provides the same routing information to siblings 46 and to FTSS 50 in a parallel manner. By providing the same routing information to different receivers, shim 42 may allow for efficient and effective response to failures. For example, if a sibling 46a fails, other siblings 46b-c may readily take over of the operation of sibling 46a. As another example, if shim 42 fails, FTSS 50 may readily provide routing information that may be used to recover shim 42. In addition, shim 42 may maintain connections (for example, TCP connections) transparently to speakers 30 and siblings 46 during failures. For example, shim may persist connection data (such as TCP SEQ numbers) to maintain the connections.

In certain embodiments, shim 42 may transfer operation from one sibling 46 to another sibling 46. The transfer may occur during a regularly scheduled transfer or in response to any suitable occurrence. In certain embodiments, shim 42 responds to failures by determining that a first sibling 46a is not operating (for example, has experienced a failure) and transferring operation to a second sibling 46b. Shim 42 may determine that a sibling is not operating in any suitable manner. For example, a sibling 46 may be regarded as not operating if sibling 46 does not respond to a request, has sent an unexpected message or output, and/or does not send an expected message. Shim 42 may transfer operation in any suitable manner. An example of a method for transferring operation is described in more detail with reference to FIG. 5.

In certain embodiments, fault tolerant storage service 50 (FTSS) may provide persistence of routing states. In certain situations, FTSS 50 may use persisted routing states to resolve hardware and/or software failures associated with latency-sensitive applications running on routers, for example, correlated, catastrophic hardware and/or software failures. In particular situations, FTSS 50 may use routing states to enable up-scaling, "five nines" resilience, and/or N-modular fault tolerance. In certain embodiments, FTSS 50 may record relations among persisted data, which may enhance the efficiency of recovery. These and other example capabilities of FTSS 50 are described further below.

In a particular embodiment, FTSS 50 provides persistence of routing states by mapping data elements to a set of tangible computing elements of one or more routers (or other suitable devices other than routers) according to a mapping scheme. The set of computing elements may be used to replicate each data element K number of times (the "K factor"). If one or more computing elements fail, FTSS 50 may use the replicated data elements for recovery. Example computing elements may include one or more routing processors (RPs), line cards, and/or other hardware, software and/or firmware of one or more routers. Although particular embodiments of FTSS 50 are explained in the context of one or more routers, alternative embodiments FTSS 50 may use computing elements of one or more devices other than routers.

In certain embodiments, FTSS 50 may map data elements to tangible, non-transitory memory of a computing element, for example, random-access memory (RAM). Memory "of" a computing element may refer to memory available for use by computing element. The memory may be a part of, contained within, or separate from the computing element. In certain instances, the use of fast memory, such as RAM, for storage of data elements may enable total latency time from failure detection to recovery from under 400 microseconds to under 2 milliseconds, depending on the platform. In addition, the use of faster memory (e.g., compared to slower hard disk memory) may enhance the performance of data updating, write-intensive operation, and/or corresponding consistency maintenance. Certain embodiments may circumvent slower recovery mechanisms, for example, BGP Graceful Restart and/or memory read-write to hard disks. FTSS 50 is described in more detail with reference to FIGS. 6 and 7.

Figure 2:
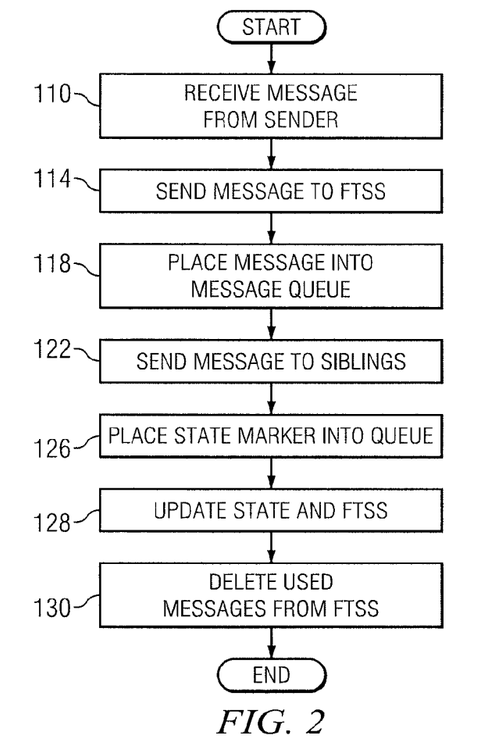
FIGS. 2 and 4 illustrate examples of methods that may be used to process incoming messages.
Figure 3:
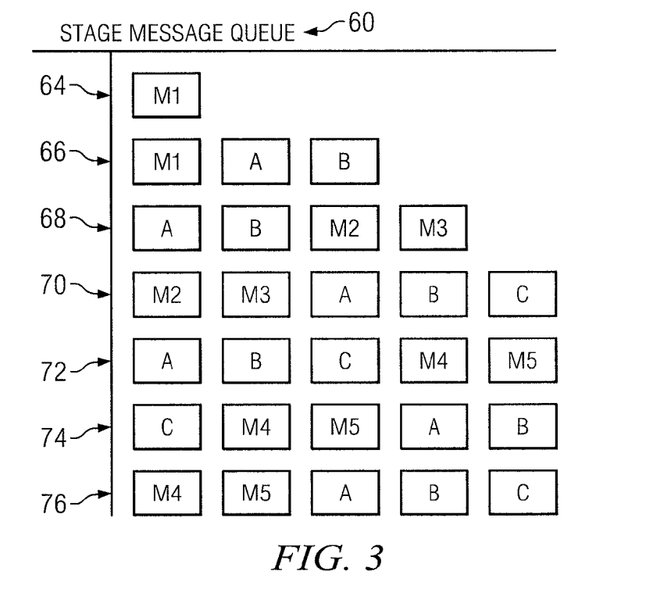
FIG. 3 illustrates an example of a message queue that may be used to process incoming messages.

FIG. 2 illustrates an example of a method that shim 42 may use to process incoming messages, and FIG. 3 illustrates an example of a message queue 60 at different stages that may be used with the method. Message queue 60 records messages that have been received at shim 42. Message queue 60 includes a sequence of received messages and state markers that indicate which received messages have been sent to particular siblings 46. In the example, a state marker A is used for sibling A 46a, state marker B is used for sibling B 46b, and state marker C is used for sibling C 46c. In the example, a state marker for a sibling 46 is placed after one or more messages to indicate that the one or more messages have been sent to the sibling 46.

The method starts at step 110, where an incoming message is received from a sender. In the example, message M1 is received from a speaker 30. In certain embodiments, shim 42 may store the state and/or attributes of the message. The message is sent to FTSS 50 at step 114. The incoming message is placed into message queue 60 at step 118. In the example, message queue 60 at stage 64 includes message M1.

The incoming message is sent to siblings 46 at step 122. One or more state markers are placed into message queue 60 at step 126 to indicate that the incoming message was sent to siblings 46. In the example, message queue 60 at stage 66 includes state markers A and B to indicate that message M1 has been sent to siblings A and B. The internal state of shim 42 and FTSS 50 may be updated at step 128.

One or more used messages that have been already sent to the siblings are deleted from message queue 60 at step 130. In the example, message M1 is a used message that has already been sent to siblings A and B, so message M1 is deleted from message queue 60 at stage 68. Message queue 60 also includes messages M2 and M3 at stage 68, indicating that messages M2 and M3 have been received by shim 42. The method then ends.

Figure 4:
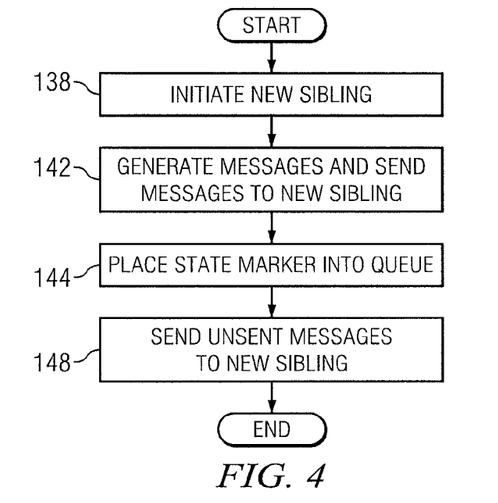

FIG. 4 illustrates another example of a method that shim 42 may use to process incoming messages. The method may use message queue 60 of FIG. 3. A new sibling is initiated at step 138. In the example, sibling C is initiated. Messages are generated and sent to the new sibling at step 142. Shim 42 may generate the messages from its internal state. In the example, messages M2 and M3 of message queue 60 are sent to sibling C. A state marker is placed into message queue 60 at step 144 to indicate that the messages have been sent to the new sibling. In the example, state markers A, B, C, are placed into message queue 60 at stage 70 to indicate that messages M2 and M3 have been sent to siblings A, B, and C, respectively.

In the example, stage 72 of message queue 60 includes messages M4 and M5, indicating that new messages M4 and M5 have been received. These message may be sent to siblings A and B but not to sibling C, because sibling C may still be initializing. Message queue 60 of stage 74 indicates that messages M4 and M5 have been sent to siblings A and B, but not to sibling C.

One or more unsent messages of message queue 60 that have not been sent to the new sibling are sent to the new sibling at step 148. In the example, message queue 60 at stage 76 indicates that unsent messages M4 and M5 that were not previously sent to sibling C have now been sent to sibling C. The method then ends.

FIG. 4 illustrates an example of a method that shim 42 may use to process outgoing messages. The method starts at step 160, where one or more first messages communicating one or more first announcements are received from first sibling 46a and sent to a protocol point. In certain embodiments, siblings 46a-c may send messages, and shim 42 may select to forward message from sibling 46a. In this example, first announcements may announce routes R1 and R2. The announcements may also include attributes of the routes.

First sibling is determined to be not operating at step 164. For example, shim 42 may determine that first sibling 46a is not operating because first sibling 46a has failed to send an expected message. Transfer of operation to second sibling 46b is initiated at step 168.

One or more second messages communicating one or more second announcements are received from second sibling 46b at step 172. For example, the second announcements may announce routes R2 and R3. Route R3 may be different from route R1 announced by first sibling 46a.

The announcements are compared at step 176 to identify incompatible announcements. Incompatibility may be determined in any suitable manner. For example, announcements may be determined to be incompatible if the routes of the announcements are different, for example, pass through different devices. Announcements may be compatible if the routes of the announcements are the same. In certain embodiments, announcements may be compatible if the routes are the same, but the attributes of the routes are different. An incompatible announcement is withdrawn from the protocol point at step 180. For example, shim 42 may instruct speaker 30 to remove route R1.

The second announcements are provided to the protocol point at step 184. The second announcements may be provided in any suitable manner. As an example, shim 42 may instruct sibling 46b to resend the second messages communicating the second announcements. As another example, shim 42 may store the second messages and then send the stored second messages. In this example, shim 42 may also store the second messages in FTSS 50.

Figure 6:
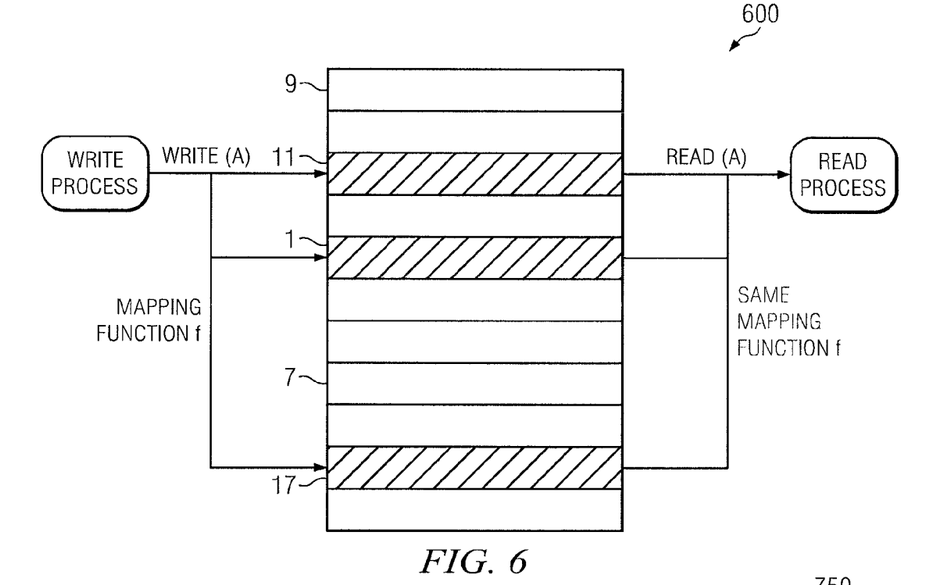
FIG. 6 illustrates an example of a mapping schema that may be used for persistence of routing states.
Figure 7A:
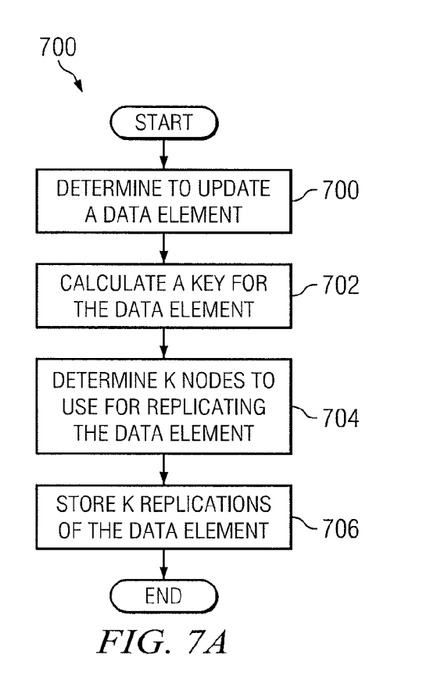
FIGS. 7A and 7B illustrate an example of a method for facilitating persistence of routing states.
Figure 7B:
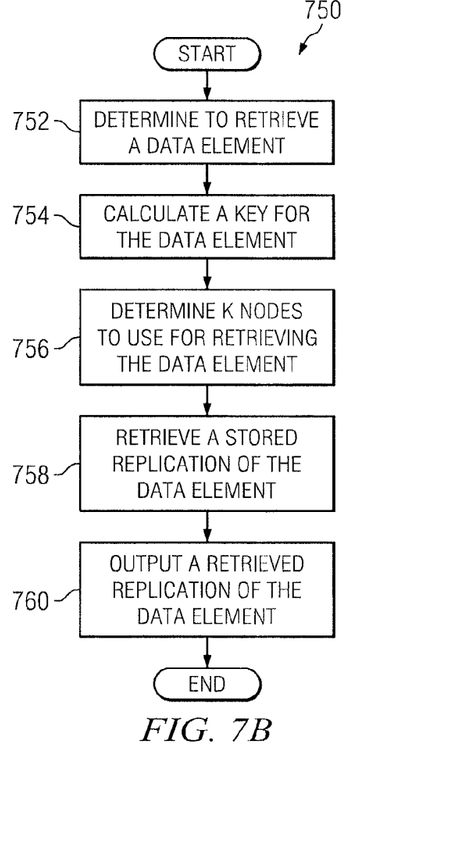

FIG. 6 illustrates one example of a mapping schema 600 that may be used by various embodiments of FTSS 50 for persistence of routing states. In certain embodiments, mapping schema 600 may dynamically map routing application data to a changing set of active computing element nodes over time, while maintaining K replicas of the routing application data. Mapping schema 600 may be implemented using any suitable mapping mechanism or function, such as one or more distributed hash tables (DHTs). In the illustrated embodiment, five nodes are actively participating in mapping schema 600. Each node value 1, 7, 9, 11, and 17 identifies a particular computing element and/or particular partition of a computing element. In certain embodiments, FTSS 50 may calculate each node value using a hash function or one or more other suitable functions. In alternative embodiments, node values may be provided to FTSS 50. In various embodiments, nodes may be deemed "actively participating" at a given point in time by FTSS 50 and/or a certain monitoring component if the nodes are found to have a functioning operational status.

FIGS. 7A and 7B illustrate an example of methods 700 and 750 that FTSS 50 may use for facilitating persistence of routing states. In particular embodiments, FTSS 50 may execute an initialization process that determines the K factor. For example, FTSS 50 may set the K factor based on input received from a user (e.g., an administrator). As another example, FTSS 50 may set the K factor as a function of factors such as anticipated failure rates of computing elements. In particular embodiments, a K factor may initialize to a default value. The K factor may be any suitable value including, for example, 2, 3, 4, or 5 or a value in the range of 5-10, 10-50, etc. In this example, the K factor is 3. In certain embodiments, K may be less than the total number N of participating computing elements. A larger K factor may yield a greater fault tolerance capability of system 10, but may also use more memory to store data element replications. FTSS 50 may maintain the K factor over time or may dynamically adjust K in response to changing conditions.

In certain embodiments, FTSS may automatically maintain. K readable replications of each persisted routing state based on the K factor. For example, FTSS 50 may respond to a determination that a node has failed by automatically re-replicating the data previously stored on the failed node to a functioning node. In this manner, system 10 may consistently maintain K readable replicas of each data element, even in the event that one or more participating nodes have failed. In particular embodiments, FTSS 50 may be capable of automatically load-balancing data elements over K participating computing elements out of a total of N participating computing elements.

FIG. 7A illustrates a write process that may be used to facilitate persistence of routing states according to one embodiment. At step 700, FTSS 50 may make a determination to update a data element A, which may be, for example, a border gateway protocol (BGP) data element. The BGP update may, for example, include all or a portion of an Internet protocol (IP) address (e.g., a prefix). FTSS 50 calculates a key for data element A from the value of data element A at step 702. For example, FTSS 50 may calculate a key for data element A by applying a hash function to the contents of data element A. In this example, FTSS 50 calculates a key value of 10 for data element A.

At step 704, FTSS 50 may select K nodes for replicating data element A. In certain embodiments, FTSS 50 may automatically select K nodes from the participating nodes according to the key value of data element A and mapping schema 600. FTSS 50 may apply mapping schema 600 in any suitable manner to select any suitable nodes for replication of data element A.

In the illustrated example of FIG. 6, FTSS 50 selects three different nodes 11, 17 and 1 to satisfy the K factor of 3. In a particular embodiment, FTSS 50 may select K nodes according to their relationship to the key value. Any suitable relationship may be used to select the first node. As an example, FTSS 50 may select the three nodes having the smallest node values that are greater than or equal to the key value. Particular mapping schemas 600 may include a modulus N function where numbers sequentially "wrap around" after they reach a certain modulus value. Thus, node value 1 may be considered "greater than" 17 as it is the next node in the sequence of mapping schema 600 moving in a positive direction. In addition, node value 17 may be considered "less than" node value 1 because it is the next node in the sequence of mapping schema 600 moving in the negative direction. In this example, according to mapping schema 600, node values 11, 17, and 1 are the first three node value greater than or equal to key value 10. As another example, FTSS 50 may select the three nodes having that greatest node values that are less than or equal to the key value. In this example, according to mapping schema 600, node values 9, 7, and 1 are the first three nodes having node values less than or equal to key value 10.

Although in the above examples FTSS 50 selects three nodes closest to the key value according to modules N of mapping schema 600, in alternative embodiments FTSS 50 may apply mapping schema 600 in a non-sequential order. For example, FTSS 50 may select nodes 1, 11, and 9. In certain situations, selecting non sequential nodes may enhance the load-balancing of data element A among nodes that may be more physically separated. Increasing the probability that replications are more physically separated from each other may mitigate the effect of localized failures.

In certain embodiments, a consistency maintenance process may be performed at step 704. For example, FTSS 50 and/or a separate monitoring component may determine whether the participating computing element nodes are presently in an operational state that enables read/write. If it is determined that one or more nodes that would otherwise be selected has failed, FTSS 50 may select one or more alternate nodes. For example, FTSS 50 may determine at step 704 that node 17 has failed, such that data cannot be read from and/or written to node 17. In response, FTSS 50 may apply the same mapping schema 600 as if node 17 did not exist. For example, FTSS 50 may skip node 17 and select nodes 11, 1, and 7 as the nodes to use for replicating data element A.

At step 706, FTSS 50 may store a replication of data element A at each of the nodes selected by FTSS 50. In certain embodiments, FTSS 50 may record relations among persisted data elements, which may enhance the efficiency of data recovery and/or enable a hierarchical organization of data. In certain embodiments, a relation between data elements may be recorded by embedding a pointer from one data element to the other data element. For example, FTSS 50 may record a relation between Network Layer Reachability Information (NLRI) and a BGP speaker that announced the information. The relation may be recorded, for example, by embedding one or more pointers from the BGP speaker data element to the NLRI data element. The pointers may be implemented as keys within the system, as opposed to physical locations. In this manner, FTSS 50 may persist and recover arbitrary pointer data structures in system 10, even though an application using system 10 may remain oblivious as to where the data actually is replicated. In certain embodiments, a consistency maintenance process substantially similar to that described above may be performed after storing each replication of the data element.

FIG. 7B illustrates a read process 750 that may be used to facilitate persistence of routing states according to one embodiment. At step 752, FTSS 50 may make a determination to retrieve a data element. For example, FTSS 50 may receive a request to retrieve data element A and/or another data element that, in certain situations, may be related to data element A. As another example, FTSS 50 may determine that one or more failures have occurred, such as a failure of one or more of the computing element nodes. FTSS 50 calculates a key for data element A from the value of data element A at step 754. For example, FTSS 50 may calculate a key for data element A by applying a hash function to the contents of data element A. In various embodiments, the same function and/or functions may be used to calculate the key at step 754 that was used at step 702. In this example, FTSS 50 calculates a key value of 10 for data element A.

At step 756, FTSS 50 may select K nodes for retrieving one or more data elements. In certain embodiments, FTSS 50 may automatically select K nodes from the participating nodes according to the key value of data element A and mapping schema 600. FTSS 50 may apply mapping schema 600 in any suitable manner to select any suitable nodes for retrieval of one or more data elements. In various embodiments, FTSS 50 may apply mapping schema 600 at step 756 in a manner substantially similar to the application of mapping schema at 704. In certain embodiments, FTSS 50 may select a subset of the K nodes for retrieving one or more data elements. For example, FTSS 50 may select one or two of the K nodes for retrieving data element A. In selecting the subset of nodes, a determination may be made as to the availability and/or operational status of the nodes. If a particular node has failed, such that FTSS 50 cannot read data element A from that node, FTSS 50 may retrieve the replication of data element A from one of the other nodes.

At step 758, FTSS 50 may retrieve at least one replication of one or more data elements. In certain embodiments, FTSS 50 may use a recorded relation to locate data element A and/or may use a pointer stored with data element A to locate another data element. At step 760, FTSS 50 may output the retrieved data element or data elements, which may include data element A. In certain embodiments, the outputted data element or data elements may be used in a recovery process performed in response to one or more system 10 failures.

In certain embodiments, FTSS 50 may enable latency tuning of routing applications. For example, each field of a given data structure may be individually controlled for storage parameters to optimize access times, which may be affected by access patterns and/or consistency requirements of an application using system 10. Any suitable algorithm may be used for maintaining consistency for each replicated data element. A more expensive algorithm may be used for data requiring serial consistency (e.g., an inode updated by several application processes), and a cheaper scheme such as eventual consistency may be used for other data (e.g., regular NLRI data updated by a single write process).

Particular embodiments involve one or more non-transitory computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, FTSS 50 may include one or more computer-readable storage media embodying software executable by one or more processors. FTSS 50 may read the software from a computer-readable storage media in mass storage device embodying the software or from one or more other sources. When executing the software, one or more processors may perform one or more steps of one or more processes described or illustrated herein, which may include, for example, determining which nodes to use for replicating the data element. In addition or as an alternative, FTSS 50 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving, at a shim, a plurality of incoming messages communicating routing information describing routes of an external region from a first protocol point of one or more protocol points, the one or more protocol points operating according to a routing protocol, the shim belonging to an internal region separate from the external region, a transport layer disposed between the shim and the one or more protocol points;
   processing and sending the incoming messages to a plurality of siblings, the siblings belonging to the internal region and at least one sibling located on a device separate from the shim, each sibling implementing a state machine for the routing protocol;
   receiving a plurality of outgoing messages from a first sibling; and
   processing and sending the outgoing messages to a second protocol point of the one or more protocol points.

2. The method of claim 1, further comprising:
   determining that the first sibling is not operating; and
   transferring operation to a second sibling.

3. The method of claim 1, further comprising:
   transferring operation to a second sibling.

4. The method of claim 1, the processing and sending the incoming messages further comprising:
   sending the incoming messages to a fault tolerant storage service.

5. The method of claim 1, the processing and sending the incoming messages further comprising:
   placing an incoming message into a message queue;
   sending the incoming message to the siblings;
   placing one or more state markers into the message queue indicating that the incoming message was sent to the siblings; and
   deleting one or more messages of the message queue that were sent to the siblings, the one or more messages comprising the incoming message.

6. The method of claim 1, the processing and sending the outgoing messages further comprising:
   receiving one or more first outgoing messages communicating one or more first announcements from the first sibling;
   receiving one or more second outgoing messages communicating one or more second announcements from a second sibling;
   comparing the first announcements and the second announcements to identify an incompatible announcement; and
   withdrawing the incompatible announcement from the second protocol point.

7. The method of claim 1, the processing and sending the outgoing messages further comprising:
   receiving one or more first outgoing messages communicating one or more first announcements from the first sibling;
   receiving one or more second outgoing messages communicating one or more second announcements from a second sibling;
   comparing the first announcements and the second announcements to identify a compatible announcement; and
   providing the second announcements to the second protocol point.

8. The method of claim 1, further comprising:
   initiating a new sibling;
   sending the incoming messages to the new sibling;
   placing a state marker into a message queue indicating that the incoming messages were sent to the new sibling; and
   sending one or more unsent messages of the message queue that have not been sent to the new sibling.

9. The method of claim 1, the one or more protocol points comprising at least one of the following:
   a speaker; or
   a routing table.

10. The method of claim 1, the routing protocol comprising at least one of the following:
    a distance vector routing protocol; or
    a link state routing protocol.

11. One or more non-transitory computer-readable media storing one or more instructions that, when executed by one or more processors, are configured to:
    receive, at a shim, a plurality of incoming messages communicating routing information describing routes of an external region from a first protocol point of one or more protocol points, the one or more protocol points operating according to a routing protocol, the shim belonging to an internal region separate from the external region, a transport layer disposed between the shim and the one or more protocol points;
    process and send the incoming messages to a plurality of siblings, the siblings belonging to the internal region and at least one sibling located on a device separate from the shim, each sibling implementing a state machine for the routing protocol;
    receive a plurality of outgoing messages from a first sibling; and
    process and send the outgoing messages to a second protocol point of the one or more protocol points.

12. The media of claim 11, the instructions configured to:
    determine that the first sibling is not operating; and
    transfer operation to a second sibling.

13. The media of claim 11, the instructions configured to:
    transfer operation to a second sibling.

14. The media of claim 11, the processing and sending the incoming messages further comprising:
    sending the incoming messages to a fault tolerant storage service.

15. The media of claim 11, the processing and sending the incoming messages further comprising:
    placing an incoming message into a message queue;
    sending the incoming message to the siblings;
    placing one or more state markers into the message queue indicating that the incoming message was sent to the siblings; and
    deleting one or more messages of the message queue that were sent to the siblings, the one or more messages comprising the incoming message.

16. The media of claim 11, the processing and sending the outgoing messages further comprising;
    receiving one or more first outgoing messages communicating one or more first announcements from the first sibling;
    receiving one or more second outgoing messages communicating one or more second announcements from a second sibling;

comparing the first announcements and the second announcements to identify an incompatible announcement; and withdrawing the incompatible announcement from the second protocol point.

17. The media of claim 11, the processing and sending the outgoing messages further comprising:

receiving one or more first outgoing messages communicating one or more first announcements from the first sibling;

receiving one or more second outgoing messages communicating one or more second announcements from a second sibling;

comparing the first announcements and the second announcements to identify a compatible announcement; and providing the second announcements to the second protocol point.

18. The media of claim 11, the instructions configured to:

initiate a new sibling;

send the incoming messages to the new sibling;

place a state marker into a message queue indicating that the incoming messages were sent to the new sibling; and send one or more unsent messages of the message queue that have not been sent to the new sibling.

19. The media of claim 11, the one or more protocol points comprising at least one of the following:

a speaker; or a routing table.

20. The media of claim 11, the routing protocol comprising at least one of the following:

a distance vector routing protocol; or a link state routing protocol.

* * * * *